No. 781,088.                                    Patented January 31, 1905.

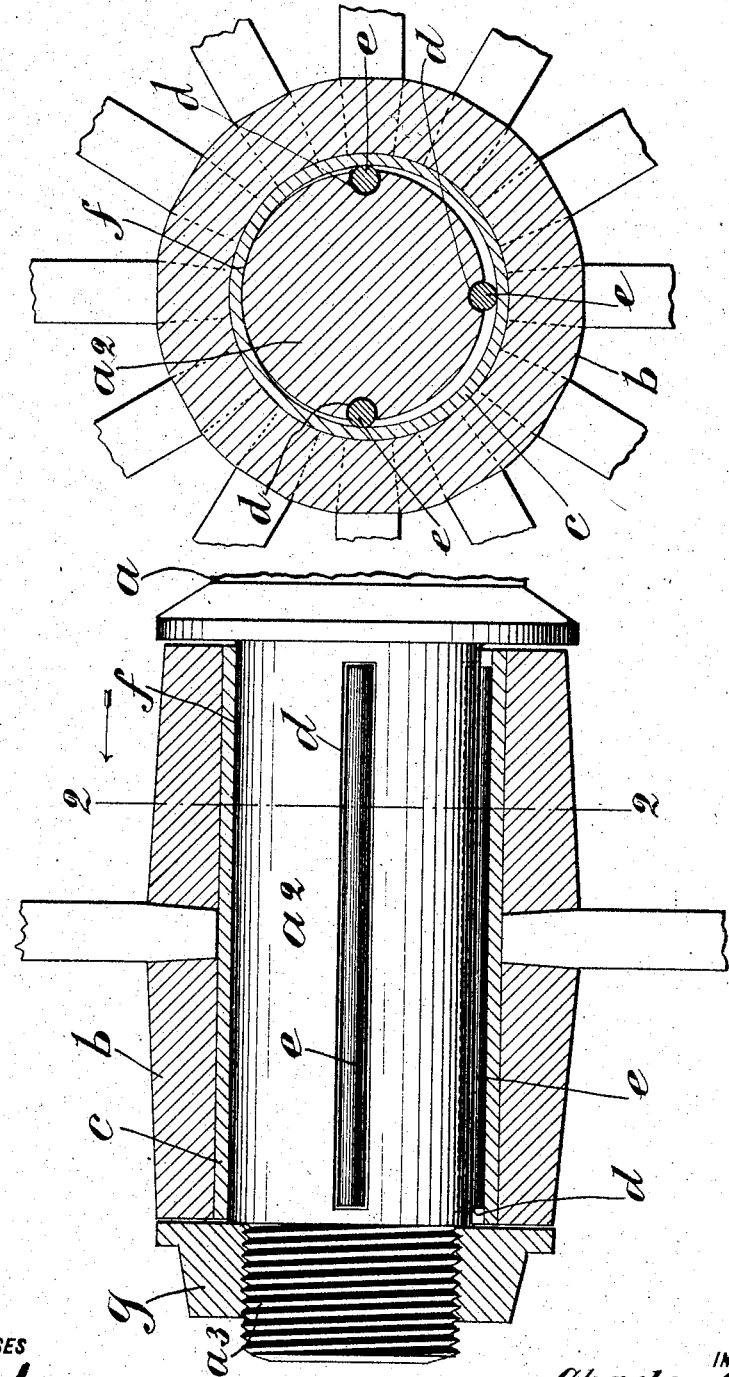

UNITED STATES PATENT OFFICE.

CHARLES OPP, OF BROOKLYN, NEW YORK.

ANTIFRICTION-BEARING.

SPECIFICATION forming part of Letters Patent No. 781,088, dated January 31, 1905.

Application filed March 30, 1904. Serial No. 200,707.

To all whom it may concern:

Be it known that I, CHARLES OPP, a citizen of the United States, residing at Brooklyn, in the county of Kings and State of New York, have invented certain new and useful Improvements in Antifriction-Bearings for Spindles, Axles, and the Like, of which the following is a specification, such as will enable those skilled in the art to which it appertains to make and use the same.

The object of this invention is to provide an improved antifriction-bearing for spindles, shafts, axles, and the like; and with this object in view the invention consists in a bearing of the class specified constructed as hereinafter described and claimed.

In the drawings forming part of this specification I have shown my improvement applied to the spindle of the axle of a vehicle, and the invention is fully disclosed in the following specification, of which the accompanying drawings form a part, in which the separate parts of my improvement are designated by suitable reference characters in each of the views, and in which—

Figure 1 is a sectional side view of the hub of a wheel of a vehicle and showing one of the spindles and one of the axles, and Fig. 2 a section on the line 2 2 of Fig. 1.

In the drawings forming part of this specification I have shown at $a$ a part of the axle of a vehicle, and at $a^2$ one of the spindles thereof, and the end of this spindle is reduced in size and screw-threaded, as shown at $a^3$ and in the usual manner, and mounted on the spindle is a wheel, the hub $b$ of which is provided with the usual metal box $c$.

In the practice of my invention I form in the bottom and in the opposite sides of the spindle $a^2$ longitudinal grooves $d$, and in these grooves are placed rollers $e$. All of the grooves $d$ are segmental in cross-section; but the opposite side grooves $d$ are deeper in transverse section than the bottom groove $d$ and the spindle $a^2$ is of less diameter than the box $c$ and the rollers $e$ bear on the box $c$, as clearly shown in Fig. 2, and by reason of this construction the spindle $a^2$ fits eccentrically in said box and bears thereon only at the top of the said spindles, as shown at $f$.

The rollers $e$ turn freely in the grooves $d$ and, as hereinbefore stated, the spindle $a^2$ bears on the box $c$ only at the top of the spindle and the weight of the load carried by the spindle bears on the bottom roller $e$, and as thus constructed it will be apparent that the friction will be reduced to a minimum.

My invention is not limited to the number of grooves $d$ and rollers $e$ shown and described, the chief feature of the invention being in the fact that the spindle bears on the box $c$ only at one point, that point being in vertical line with the bottom roller $e$. As shown in the drawings, the rollers $e$ and grooves $d$ extend approximately the full length of the spindle, but do not extend outwardly to the nut $g$, which holds the wheel in place on the spindle; but my invention is not limited to the length of the grooves $d$ and rollers $e$, and they may extend to the full length of the spindle, if desired, or to the full length of the hub $b$. It will also be apparent that said grooves may be of any desired dimensions in transverse section, the only object in this connection being to form the rollers so that they will fit the said grooves, and the thickness of the rollers will depend on the diameter of said grooves or the transverse dimensions thereof.

It will be apparent that these antifriction-rollers facilitate the starting of the vehicle in either direction, the bottom roller $e$ sustaining the weight placed on the spindle, and it will also be apparent that the spindle may be oiled or lubricated in the usual or any desired manner, and the grooves $d$ serve to retain the lubricant, and the space around the spindle between said rollers at the sides and bottom portions of the spindle also serve for a similar purpose, and the spindle or bearing, including the rollers, may thus be kept thoroughly lubricated at all times.

A vehicle provided with my improved spindle-bearing may be propelled with much less friction, and consequently by much less power, than with spindle-bearings as usually constructed, and my improvement may be applied to any form of vehicle or truck or to automobiles or any other devices of this class and to stationary shafts, axles, and the like mounted in rotatable boxes or supports, and it will be apparent that new rollers may be substituted for the old ones whenever necessary.

Having fully described my invention, what I claim as new, and desire to secure by Letters Patent, is—

A spindle which is of less diameter than the bore of the hub or box through which it passes, said spindle being provided in the opposite sides and in the bottom thereof with longitudinal grooves, the grooves at the opposite sides of the spindle being deeper than that at the bottom thereof, and bearing-rollers placed in said grooves and whereby the spindle is supported eccentrically in the hub or box and bears thereon only at the top thereof all of said rollers being of the same diameter, substantially as shown and described.

In testimony that I claim the foregoing as my invention I have signed my name, in presence of the subscribing witnesses, this 29th day of March, 1904.

CHARLES OPP.

Witnesses:
  C. E. MULREANY,
  F. A. STEWART.